United States Patent [19]
Domanik et al.

[11] Patent Number: 5,930,732
[45] Date of Patent: Jul. 27, 1999

[54] SYSTEM FOR SIMPLIFYING THE IMPLEMENTATION OF SPECIFIED FUNCTIONS

[75] Inventors: Richard A. Domanik, Libertyville; Dennis W. Gruber, Arlington Heights; William J. Mayer, South Barrington, all of Ill.

[73] Assignee: AccuMed International, Inc., Chicago, Ill.

[21] Appl. No.: 08/529,188

[22] Filed: Sep. 15, 1995

[51] Int. Cl.⁶ .................................................. G05B 19/045
[52] U.S. Cl. ................................ 702/31; 702/19; 702/22; 364/167.05; 364/167.12; 364/190; 359/368
[58] Field of Search ..................................... 364/525, 410, 364/167.01, 188–190, 140, 146, 474.22, 474.28, 550, 551.01, 579, 709.11–709.16, 167.02, 528.01, 528.1, 528.37, 167.05, 167.1, 167.11, 167.12; 235/464, 470, 456, 494, 375, 472; 356/72, 446, 39, 73, 372, 375, 380, 386; 414/331, 788.4; 359/385, 368, 383, 391, 376, 17, 20, 24; 348/500, 206, 552, 79, 80; 386/83; 435/287.2; 358/448; 395/924; 250/310, 307, 311, 442.11, 559.06, 201.3–201.5; 128/632, 637; 341/20–24, 32–34; 345/157, 169, 172, 163, 167, 161, 184, 901, 902, 156, 158; 382/224, 133, 134, 311, 313, 318, 319, 255, 128, 129; 702/19–22, 30–32, 159, 40, 134, 150, 28; 436/43, 46; 206/316.1, 459.1, 456; 73/863.01; 209/938; 422/65, 63, 104, 44, 57; 74/471 XY

[56] References Cited

U.S. PATENT DOCUMENTS

| | | | |
|---|---|---|---|
| 3,416,250 | 12/1968 | Schweers | 206/456 |
| 3,418,456 | 12/1968 | Hamisch et al. | 235/464 |
| 3,600,556 | 8/1971 | Acker | 235/464 |
| 3,745,314 | 7/1973 | Mathias et al. | 235/470 |

(List continued on next page.)

FOREIGN PATENT DOCUMENTS

| | | |
|---|---|---|
| 849379 | 8/1970 | Canada . |
| 1272285 | 6/1985 | Canada . |
| 1299179 | 4/1992 | Canada . |
| 1304612 | 7/1992 | Canada . |

(List continued on next page.)

OTHER PUBLICATIONS

Article entitled: "Autostage System", p. 165, Photonics Spectra, Jun. 1994.

The LEP Robotic Slide Handling System (description and photograph), by LUDL Electronic Products Ltd., date unknown. (No date/.

"Nikon Biostation® Creates A Fully Automated Cytology Workstation In Your Laboratory", pp. 1–3, dated Feb. 1994.

G. Brugal et al., "Introduction to Cytometry and Histometry", pp. 1–7, dated Jan. 20–24 and 27–31, 1992.

*Primary Examiner*—Hal Dodge Wachsman
*Attorney, Agent, or Firm*—McDonnell Boehnen Hulbert & Berghoff

[57] ABSTRACT

A machine, method and medium for implementing functions using an input device in a manner that enhances efficient operation of a mechanism capable of operating in at least two states. The functions are implemented via a convenient input device, such as a mouse. One or more specified actuators of the input device implement a given function when the mechanism is in a first state, while at least one of those actuators implements a different function when the mechanism is in a second state. In embodiments of the present invention contemplating that the mechanism is a microscope system, two states in which the microscope system is envisioned to operate are a scan state and a pause state. The scan state allows the microscope system to execute a pre-defined scan sequence, while the pause state allows the microscope system to pause from that sequence.

7 Claims, 7 Drawing Sheets

U.S. PATENT DOCUMENTS

| | | | |
|---|---|---|---|
| 3,851,972 | 12/1974 | Smith et al. | 356/72 |
| 3,902,615 | 9/1975 | Levy et al. | 414/331 |
| 4,141,458 | 2/1979 | Brooks et al. | 414/331 |
| 4,142,863 | 3/1979 | Covington et al. | 422/63 |
| 4,175,860 | 11/1979 | Bacus | 356/39 |
| 4,250,405 | 2/1981 | Ashcroft et al. | 235/456 |
| 4,367,915 | 1/1983 | Georges | 359/385 |
| 4,402,613 | 9/1983 | Daly et al. | 356/446 |
| 4,422,105 | 12/1983 | Rodesch et al. | 386/83 |
| 4,427,332 | 1/1984 | Manriquez | 414/331 |
| 4,449,042 | 5/1984 | Hampson et al. | 235/464 |
| 4,588,341 | 5/1986 | Motoda | 414/788.4 |
| 4,628,193 | 12/1986 | Blum | 235/375 |
| 4,658,960 | 4/1987 | Iwasa | 206/459.1 |
| 4,858,014 | 8/1989 | Zeevi et al. | 348/206 |
| 4,965,725 | 10/1990 | Rutenberg | 382/224 |
| 5,021,218 | 6/1991 | Davis et al. | 422/57 |
| 5,058,046 | 10/1991 | Lapeyre | 364/709.16 |
| 5,081,038 | 1/1992 | Sugaya et al. | 436/46 |
| 5,154,889 | 10/1992 | Muraishi | 422/44 |
| 5,209,903 | 5/1993 | Kanamori et al. | 422/65 |
| 5,245,530 | 9/1993 | Taki | 364/167.02 |
| 5,260,556 | 11/1993 | Lake et al. | 235/494 |
| 5,270,006 | 12/1993 | Uchigaki et al. | 422/104 |
| 5,280,276 | 1/1994 | Kwok | 345/163 |
| 5,285,861 | 2/1994 | Nakamura | 74/471 XY |
| 5,287,182 | 2/1994 | Haskell et al. | 348/500 |
| 5,287,272 | 2/1994 | Rutenberg et al. | 382/224 |
| 5,332,549 | 7/1994 | MacIndoe, Jr. | 422/63 |
| 5,364,790 | 11/1994 | Atwood et al. | 435/287.2 |
| 5,380,488 | 1/1995 | Wakatake | 422/65 |
| 5,414,421 | 5/1995 | Saito | 364/709.14 |
| 5,513,013 | 4/1996 | Kuo | 358/448 |
| 5,526,258 | 6/1996 | Bacus | 382/129 |
| 5,563,631 | 10/1996 | Masunaga | 345/169 |
| 5,655,029 | 8/1997 | Rutenberg et al. | 382/133 |

FOREIGN PATENT DOCUMENTS

| | | |
|---|---|---|
| 2042075 | 9/1992 | Canada . |
| 2086786 | 4/1994 | Canada . |
| 0453239 A1 | 10/1991 | European Pat. Off. . |
| 0577084 A2 | 1/1994 | European Pat. Off. . |
| 195 48 091 A1 | 7/1996 | Germany . |
| 63-305510 | 12/1988 | Japan . |
| 1439986 | 6/1976 | United Kingdom . |
| 2145544 | 3/1985 | United Kingdom . |
| 2212301 | 7/1989 | United Kingdom . |
| 2219104 | 11/1989 | United Kingdom . |
| WO 93/16436 A1 | 8/1983 | WIPO . |
| WO 87/01214 | 2/1987 | WIPO . |
| WO 90/07162 | 6/1990 | WIPO . |

SYSTEM FOR SIMPLIFYING THE IMPLEMENTATION OF SPECIFIED FUNCTIONS

CROSS REFERENCE TO RELATED APPLICATIONS

The present application is related to the following applications which are filed concurrently herewith:

U.S. patent application Ser. No. 08/528,789, filed Sep. 15, 1995, now abandoned, entitled "Automated Specimen Handling System and Method for Sorting the Specimens";

U.S. patent application Ser. No. 08/529,220, filed Sept. 15, 1995, now abandoned, entitled "Cytological Specimen Analysis System with Individualized Patient Data";

U.S. patent application Ser. No. 08/529,197, filed Sept. 15, 1995, now abandoned, entitled "Three Dimension Mouse";

U.S. patent application Ser. No. 08/529,198, filed Sept. 15, 1995, now abandoned, entitled "Multifunctional Control Unit for a Microscope";

U.S. patent application Ser. No. 08/528,793, filed Sept. 15, 1995, now abandoned, entitled "Specimen Management System"; and U.S. patent application Ser. No. 08/528,791, filed Sept. 15, 1995, now U.S. Pat. No. 5,690,892, entitled "Cassette for Use with Automated Specimen Handling System."

Each of the above applications is assigned to the assignee of the present application and is hereby incorporated by reference.

FIELD OF THE INVENTION

The present invention relates to performing a plurality of specified functions, and for implementing those functions in a manner that enhances efficiency and reduces the complexity of the necessary controls. More specifically, the present invention relates to a machine, method and medium for implementing functions as mentioned above, utilizing a mechanism capable of operating in at least two states, and including (or utilizing signals from) a convenient (e.g., hand-held) input device where the functions implemented by the controls at any point in time depend upon the current state of the mechanism (i.e., upon the context in which the mechanism is operating at a given moment). Embodiments of the invention contemplate that the specified functions can be those used in conjunction with a laboratory system microscope, utilizing a scheme such that the number of controls necessary to perform the functions are decreased, and the efficiency and intuitiveness of use of the microscope system is enhanced.

BACKGROUND OF THE INVENTION

Over the years, user-controlled mechanisms such as electromechanical devices have become more and more complex, with users demanding more and more functionality from these mechanisms. Adding to the complexity of user-controlled mechanisms has been the advent of computer technology, which is increasingly used in conjunction with electromechanical devices. Though the complexity and functionality of such mechanisms has been increasing, users nonetheless demand that such mechanisms be relatively simple to operate.

Many of the mechanisms referred to above often have a variety of different types of input devices to initiate implementation of the various functions that the mechanisms can perform. For example, a joy stick might control one set of functions, a track ball another, a keyboard another, etc. As can be appreciated, the use of numerous input devices can become unwieldy in many situations. Moreover, their use can be particularly inappropriate in situations requiring the user to concentrate on activity associated with the mechanisms, thus forcing the user to grope about for the appropriate input device.

Given the situation noted above, it may be desirable (where possible) to use a single type of input device to control all of the functions needed. However, where the number of functions that need to be performed are relatively large, then the number of controls (i.e., actuators) needed will also increase, thus making it difficult for a user to efficiently control the mechanism. Thus, use of a single type of input device, by itself, is not a solution to the problem, either. Consequently, what is needed is some scheme for controlling the functions in a manner that decreases the number of controls and enhances the efficiency and simplicity of usage.

A specific example of a user-controlled mechanism potentially requiring multiple controls is a modern medical microscope system. The users of such microscope systems are often required to examine a multitude of different specimens in a relatively short amount of time. At the same time, it is often crucial that they focus their attention on the examination of these specimens, rather than diverting too much attention to working the controls. Consequently, it is important to the user that the functions of the microscope be controllable in an efficient and intuitive manner. Some typical functions that a user may find desirable to control using an input device include the ability to change lens objectives, focusing, executing a pre-defined sequence through which the microscope system scans a specimen, speeding up or slowing down that scan sequence, marking a portion of the specimen, and adjusting the position of the microscope stage.

As with the generalized mechanism mentioned above, various other devices can be linked to, and otherwise associated with, the microscope system. For example, a computer based data management system (DMS) can be linked to the microscope system such that data concerning the specimen (both from the microscope directly and as a result of user input) can be entered into the DMS. Adding functions associated with the DMS, however, may require even more controls that the user has to manipulate in operating the microscope system.

An example of a microscope system that has attempted to provide a user with at least some of the functionality mentioned above is the "Biostation" from Nikon Inc., Instrument Group of Melville, N.Y. In this system, a "control box" contains a multitude of input devices including a track ball, numerous buttons and other types of controls used to initiate the type of functions mentioned above. However, since the Biostation forces the user to manipulate a multitude of input devices, it suffers from the same deficiencies mentioned above. Thus, what is needed is some scheme for controlling the functions of a microscope system in a manner that decreases the number of controls and enhances the efficiency and simplicity of usage.

SUMMARY OF THE INVENTION

The present invention overcomes the deficiencies mentioned above by providing a machine, method and medium for implementing functions using an input device in a manner that enhances efficient operation of a mechanism. In particular, such mechanisms are envisioned to be capable of operation in at least two states. Specifically, it is envisioned that the functions are implemented using some type of convenient input device, such as a mouse. One or more specified actuators of the input device are contemplated by embodiments of the present invention to implement a given function when the mechanism is in a first state, while at least one of those actuators implements a different function when the mechanism is in a second state. In this way, more functions can be controlled by the input device than there are actuators.

In embodiments contemplated by the present invention, at least one of the actuators mentioned above changes the state of the mechanism from the first state to the second state (either as a function unto itself, or in the process of implementing some other specified function). In general, the scheme as mentioned above allows the actuators to be configured so that the functions of the actuators in a given state are intuitive to a user (i.e., so that it "makes sense" for a given actuator to implement a particular function in a give state, while then implementing a different but related function in another state). In addition, embodiments of the present invention also contemplate that an external device can be communicatively linked with the mechanism so that the input device is capable of intuitively and efficiently controlling the external device as well.

In embodiments of the present invention contemplating that the mechanism is a microscope system, two states in which the microscope system is envisioned to operate in, are a scan state and a pause state. The scan state allows the microscope system to execute a pre-defined scan sequence, while the pause state allows the microscope system to pause from that sequence.

When the microscope system mentioned above is in the scan state, embodiments of the present invention contemplate that functions that can be implemented via the actuators of the input device include (without limitation) changing the speed of the scan sequence (e.g., by moving the mouse in a given direction), focusing the microscope system, and changing the state of the microscope system to a pause state. In the pause state, the implemented functions include (without limitation) changing the objectives on the microscope, logically marking a given portion of a specimen, focusing the microscope, moving the position of the microscope stage, and changing the state of the microscope system to the scan state. As with the more general embodiments mentioned above, an external device can also be utilized with (or otherwise be a part of) the microscope system. For example, a computer based data management system can be used and controlled by the input device via the microscope system.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENT

Referring to FIGS. 1–7, the present invention relates to performing a plurality of specified functions, and for implementing those functions in a manner that enhances efficiency and reduces the complexity of the necessary controls. More specifically, the present invention relates to a machine, method and medium for implementing functions as mentioned above, utilizing a mechanism capable of operating in at least two states, and including (or utilizing signals from) a convenient (e.g., hand-held) input device where the functions implemented by the controls at any point in time depend upon the current state of the mechanism (i.e., upon the context in which the mechanism is operating at a given moment). Embodiments of the invention contemplate that the specified functions can be those used in conjunction with a laboratory system microscope, utilizing a scheme such that the number of controls necessary to perform the functions are decreased, and the efficiency and intuitiveness of use of the microscope system is enhanced.

Figure 1:
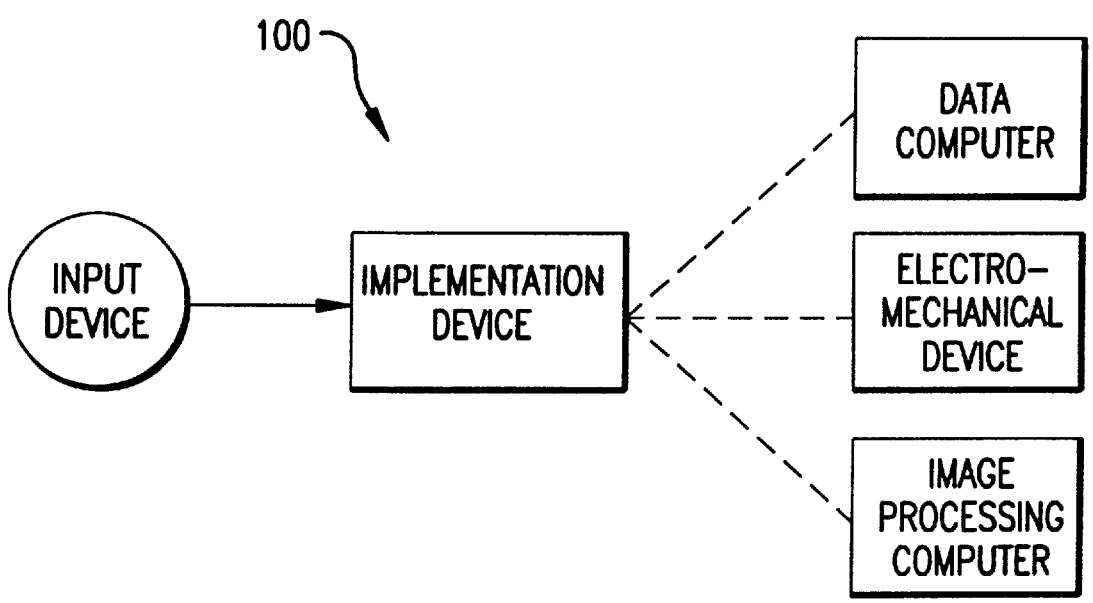
FIG. 1 is a block diagram depicting the general components of the present invention as contemplated by embodiments of the present invention.

The present invention is now further explained with regard first to FIG. 1. Referring to FIG. 1, an implementation device 104 is shown, which is capable of implementing a number of specified functions. Embodiments of the present invention contemplate that the implementation device is operable in two or more different states. Using an example where the implementation device 104 is some piece of earth-moving equipment, two possible states that it could operate in are "move" (i.e., move forward) and "park." The earth-moving equipment could have any number of user-implementable functions, including "speed up," "slow down," "lower stabilization supports," etc.

To reduce the number of controls that a user has to manipulate to implement the functions of the implementation device 104, the present invention contemplates the use of an input device 102 having two or more easily-accessible actuators (i.e., actuators that allow the user to better focus on watching the task at hand, decreasing the need to look for, or grope for, an appropriate input device or actuator). In addition, the present invention also contemplates that one or more of the actuators can mean two different things (i.e., implement two different functions) depending upon the state that the implementation device 104 is in (i.e., depending upon the context in which the implementation device 104 is used at a given point in time).

Using the earth-moving example mentioned above, one of the actuators might be implemented to mean "speed up" in the "move" state, but then mean "lower the stabilization supports" in the "park" state. This configuration might make sense to help reduce the number of actuators needed, since one would not want lower the stabilization supports of the earth-moving equipment while it is moving (i.e., in the "move" state), nor would it make sense to "speed up" when the earth-moving equipment is in the "park" state. Such an arrangement thus allows for a more intuitive organization of the controls, making operation of the implementation device 104 easier.

Embodiments of the present invention contemplate that the implementation device 104 can be any number of different types of electromechanical and/or computer devices. As can be appreciated, the appropriate functions associated with the actuators on the input device 102 will depend upon the nature of the implementation device 104 and the functions that it is capable of implementing. However, as indicated above, it is contemplated that the implementation device 104 is capable of operation in two or more states, wherein a change from at least one of the states to another causes at least one actuator on the input device 102 to change function from the previous state.

Concerning the input device 102, at least some embodiments of the present invention contemplate that the input device 102 is some hand-held device such as a mouse, track ball or similar type device. However, it should be understood that the present invention contemplates a variety of other types of input devices as well.

In addition to the use of the implementation device 104 by itself, the present invention also contemplates that other types of devices can be used in conjunction with (or as a part of) implementation device 104, and controllable via the input device 102. For example, embodiments of the present invention contemplate that a data computer 106 can be linked to the implementation device 104 such that control of the data computer 106 can be accomplished by the input device 102 via the implementation device 104.

Using the earth-moving scenario as an example of input device 102 control of the data computer 106, assume that the weight of material lifted by each scoop of a shovel attached to the earth-moving equipment is to be recorded. Also assume that the user's comments concerning the nature of the material lifted by the shovel are also to be recorded, along with the weight. Then, the present invention envisions that an actuator on the input device 102 can be set to lift the material into the shovel and raise it to a certain position for viewing by the user. During the raising of the shovel (representing a first state), the other actuators may have various functions, such as "emergency stop" or "shine light on material."

Once the shovel has been raised to the appropriate position, the implementation device 104 might then be placed into a second state (e.g., by virtue of the shovel reaching the appropriate position, as initiated by the actuator mentioned above). In this second state, the weight of the material might automatically be fed into the data computer 106. Also, the same actuator of the input device 102 that was used to lift the shovel in the first state might then be used to control the data computer 106, such as for allowing the user to select a type of material (e.g., from a menu) representative of the material seen in the shovel. Thus, it is contemplated that the present invention effectively links the data computer 106 with the implementation device 104 in a way that allows the implementation device 104 and the data computer 106 to be controlled by the same input device 102 in an efficient manner.

Embodiments of the present invention contemplate that the implementation device 104 and the data computer 106 can be linked using any number of schemes, including communication between RS232 ports, with an appropriate communication protocol. It is also contemplated that the implementation device 104 has some type of control mechanism, such as a processor, that can interpret signals received from input device 102 and manipulate the various servos and external devices that may be associated with it. In general, the control mechanism must also be able to implement the function that is appropriate given the current state of the implementation device 104, in accordance with some stored program (not shown) associated with the processor. An example of a processor and various components contemplated for use with embodiments of the present invention will be discussed further below, in conjunction with a specific microscope system example.

In addition to data computer 106, the present invention contemplates that any number of different types of devices can also be associated with implementation device 104, such as an electromechanical device 108 or an image processing computer 110 (or any other type of computer, for that matter). Due to the linkage of these external devices, it is contemplated that implementation device 104 automatically detects the presence of any external devices.

Figure 2:
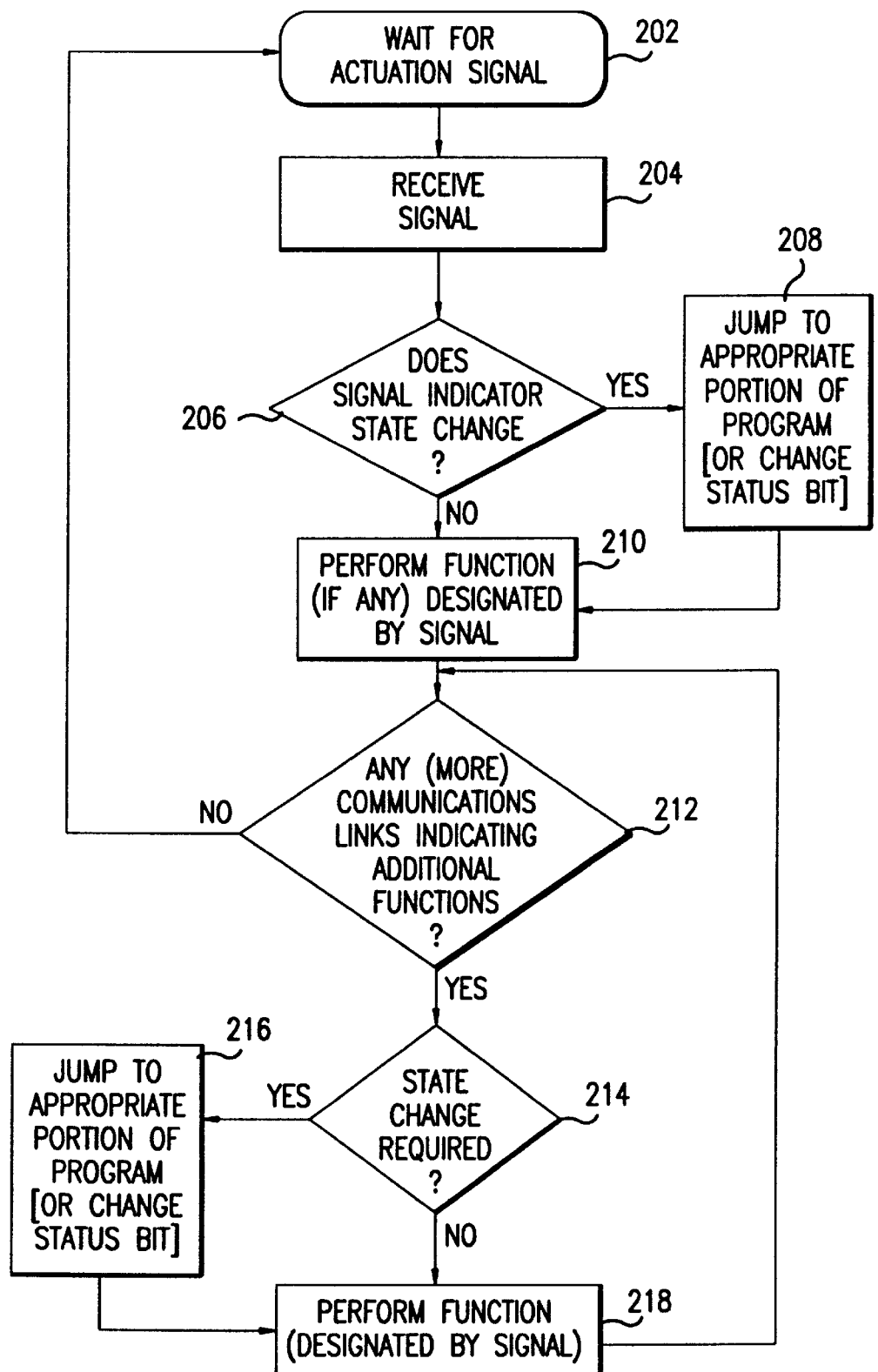
FIG. 2 is a flow diagram of a method contemplated by embodiments of the present invention concerning implementation of functions based upon receipt of given signals and whether a state change is to occur.

Various methods of operation as contemplated by embodiments of the present invention are shown by FIG. 2. Referring now to FIG. 2, the present invention contemplates waiting for some type of actuation signal (e.g., depression of a mouse button, etc.) as indicated by a block 202. When the signal is received (indicated by a block 204), a determination is then made concerning whether the signal indicates a change of state (via the current context of some implementation device), as indicated by a decision block 206. If there is no change of state, then the designated function is performed, as indicated by a block 210. An example of that situation can be envisioned using the earth-moving scenario, where the received signal might cause a light to shine into the shovel, but not affect the function of any other actuators.

However, the received signal might, instead, indicate a change in state. An example of this situation might be where an actuator was actuated (and signal received) to put the earth-moving equipment into the "move" state, thus changing the function of various actuators. In that situation, embodiments of the present invention contemplate that an appropriate portion of the stored program is "jumped to" (i.e., control is passed to that portion) so that the actuation of the actuators will result in the intended actions (given the current state). Thus, in this example, the appropriate portion of the program will be executed by the processor such that a signal received from a particular actuator will be interpreted as a request to "speed up" rather than to "lower stabilization supports." This type of occurrence is indicated by a block 208.

In other embodiments contemplated by the present invention, a status bit is changed when the state is to be changed, as also indicated by block 208.

After block 208, the next step is that the function designated by the signal is then performed (if any), as indicated by block 210. The "if any" indicates that the received signal might indicate only that a change in state is to take place (i.e., at least one of the actuators will change functions), but that no specific function is yet to be performed.

It should be understood that embodiments of the present invention also contemplate situations where the performance of a function (as indicated by block 210) may precede the changing of a given state (as indicated by block 208).

The next step is to determine whether there are any communications links indicating that additional functions should be performed, as indicated by a decision block 212. This would be the case where, for example, an external device such as data computer 106 is linked to the implementation device 104. If there are no communications links, control goes back to block 202, and another actuation signal is waited for.

If, however, communications links are detected, then the next step will be to determine whether a state change is required, as indicated by a decision block 214. (Often, just prior to reaching decision block 214, embodiments of the present invention contemplate that an actuation signal will be waited for, in the same way as was done regarding block 202). If a state change is required, then the next step is to jump to the appropriate portion of the program (or change the status bit) as indicated by a block 216. This typically will occur when a function is to occur that affects the external device. Thus, this can be thought of as placing the implementation device into an "external state." It should be understood, however, that the present invention contemplates utilizing any number of different states, as well.

The next step (from decision block 214 if no state change is required, or from block 216 if a state change is required) is to perform the function designated by the signal, as indicated by a block 218. Then, a determination is made as to whether any more communication links exist indicating that additional functions may need to be accounted for, as further indicated by decision block 212.

It should, of course, be understood that the present invention contemplates a variety of configurations beyond what is depicted by FIG. 2, and that embodiments depicted by FIG. 2 are disclosed by way of example.

Figure 3:
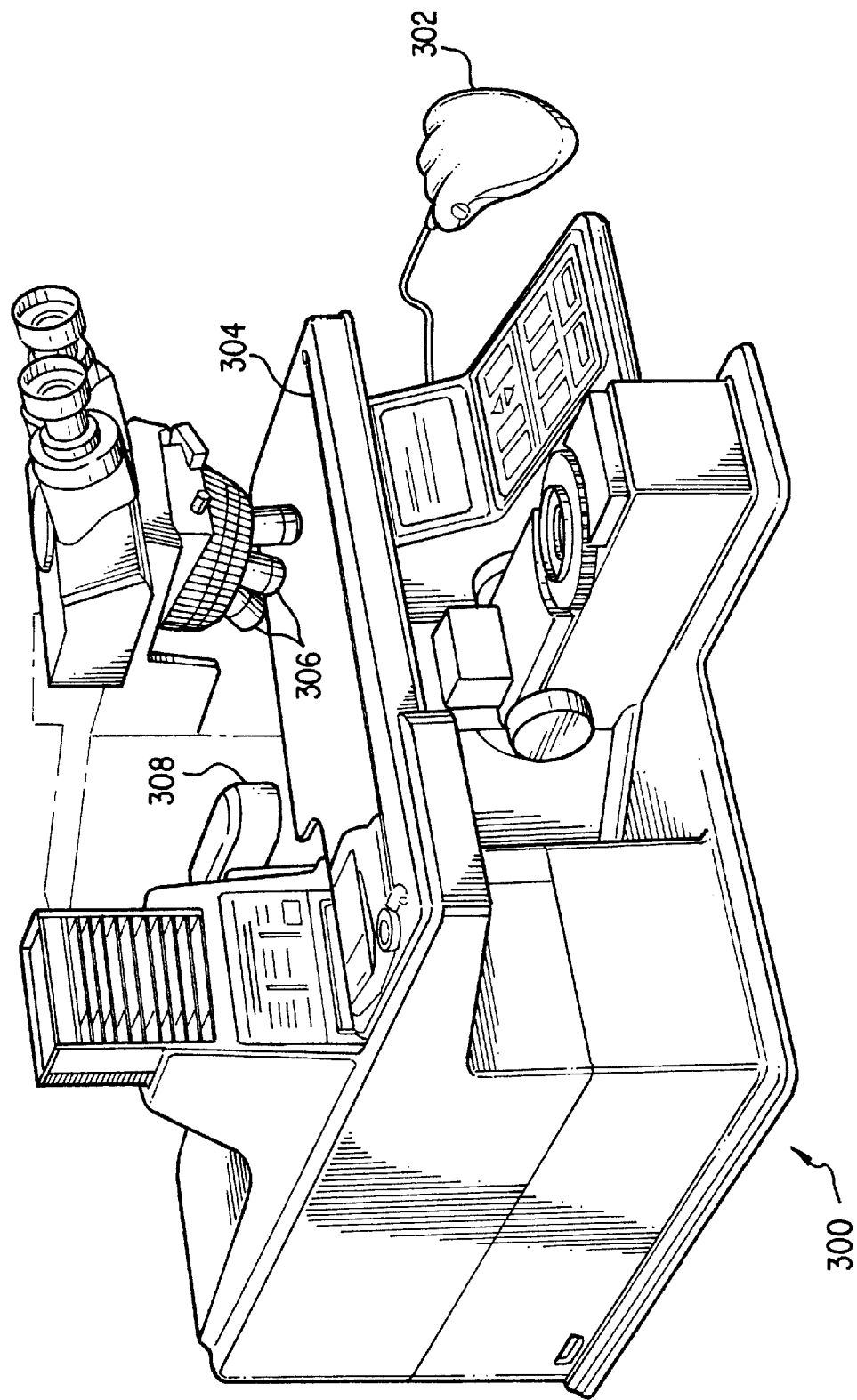
FIG. 3 is a diagram of a microscope system as contemplated by embodiments of the present invention.

Embodiments of the present invention relating specifically to a microscope system will now be described, beginning with a discussion of FIG. 3. Referring now to FIG. 3, a microscope system 300 is shown, having a variety of components. The components and their functionality as discussed below are given by way of example, as the present invention contemplates that any number of different types of components and functions can be used in such a microscope system.

In the particular example discussed here, it is contemplated that components such as various optical components are from an Olympus BX-40 microscope from Olympus Optical Corporation of Tokyo, Japan, although any number of different microscope components could also have been used. In addition, embodiments of the present invention contemplate that the microscope system 300 includes a motorized stage 304 upon which a slide containing a specimen can be placed for viewing. Embodiments of the present invention also contemplate that an automated scan sequence can be executed for moving the stage 304 through various positions so that a specimen can be efficiently viewed. When a scan sequence is being executed, the microscope system 300 can be thought of as being in a "scan" (or "resume") state. The scan sequence can also be paused at a given period of time, allowing the stage 304 to be positioned manually. This state is referred to as the "pause" state.

Other functions that microscope system 300 automates includes the ability to change objectives 306 of the microscope, and the ability to focus the microscope by moving the objectives 306 toward or away from the specimen on stage 304. Another function contemplated allows a portion of the slide to be logically marked for future reference, and when the scan sequence is completed, to then physically mark the slide at the spot or spots at which it was logically marked at, using a print device 308.

According to embodiments of the present invention, the functions mentioned above are envisioned as being controlled via a single input device, such as the one shown by an input device 302. Here, the input device is shown to be a mouse, although any number of convenient input devices are contemplated. In any event, the present invention contemplates that input device 302 has one or more actuators whose functions can vary in accordance with the current state of the microscope system 300. In this way, more functions can be assigned to the input device 302 (in the course of the operation of the microscope system 300) than there are actuators on the input device 302. Moreover, this implementation also allows for a plurality of functions to be executed in an efficient and intuitive manner.

Figure 4:
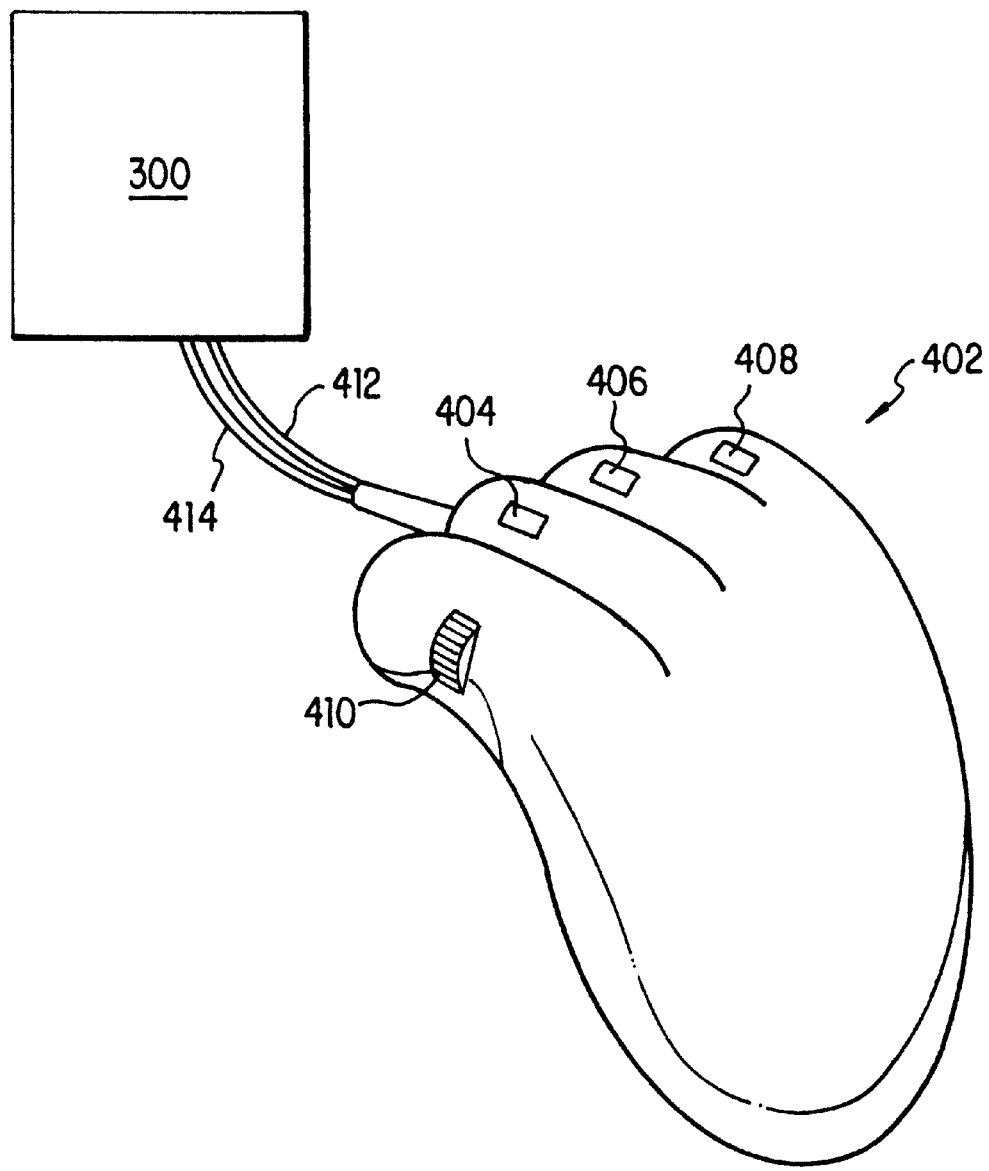
FIG. 4 is a diagram of a mouse input device example as contemplated by embodiments of the present invention.

Various embodiments of the present invention contemplate that the input device 302 could be of a type shown by FIG. 4. Referring now to FIG. 4, a mouse 402 having three buttons (404, 406, 408), a track ball (on the underside of mouse 402) and a thumb wheel 410 are shown. To change the state of the microscope system 300, the assigned functionality could be, for example, that the left button 404 toggles the microscope system 300 between executing the scan sequence and pausing (and, thus, between the scan state and pause state).

When operating in the scan state, embodiments of the present invention contemplate that movement of the mouse 402 in a first direction (e.g., to the left) will increase the speed at which the scan sequence executes, while movement of the mouse 402 in a second direction (e.g., to the right) will decrease the speed. Thus, in the example embodiments, the "track ball" portion of the mouse 402 is the actuator that controls the scanning speed while the microscope system 300 is in the scan state.

When the microscope system 300 is in the pause state by virtue of actuation of the left button 404, movement of the mouse will then manually position the stage 304. Also, while in the pause state, embodiments of the present invention contemplate that the objectives 306 can be changed by, for example, the right button 408, while objects in the specimen can be logically marked by, for example, the middle button 406. While the microscope system 300 is in the scan state, it is contemplated that the center and right buttons 406 and 408 are deactivated, thus, not allowing for the marking or changing of objectives 306. However, it should be understood that other embodiments of the present invention contemplate that those actuators can nonetheless retain these functions (or have any number of other functions, for that matter) during the scan state.

Lastly, embodiments of the present invention as depicted by FIG. 4 contemplate that the mouse 402 will have a thumb wheel 410 for allowing the microscope system 300 to be focused. It is contemplated that function can be used in either the scan or the pause state. In one embodiment using a modified "Sicos" mouse (from Mouse Tracks of Nevada), the same or similar type of encoder disk used for the x and y coordinates (i.e., for the track ball portion) is also contemplated for use with the thumb wheel, although the precise implementation is not crucial for purposes of the present invention. In any event, it should be understood that the function of focusing the microscope system 300 could also be implemented using one of the other actuation devices, such as one of the buttons (and, thus, depending upon the implementation, it may be desirable in that situation to use a four-button mouse).

The specific configuration of the actuators used with the mouse 402 of FIG. 4 and assignment of functions thereon have been found to be particularly efficient in allowing a user to intuitively control the various features of microscope system 300. However, it should be understood that the present invention contemplates that the actuators of the mouse 402 of FIG. 4 could be configured in any number of other ways to perform the above-mentioned functions, as well as any number of additional functions, as well. Also, as stated above, the present invention contemplates that a variety of other types of mouse or other input devices could be used. However, for more information concerning the specific example mouse 402 shown by FIG. 4, see the patent application which is entitled "Three Dimensional Mouse," filed by Domanik, Gombrich, Gruber, Gunther, and Mayer on the same day as the present application, and which, as discussed above, is incorporated by reference herein.

In addition to controlling the functions on the microscope system 300, embodiments of the present invention also contemplate that functions on external devices such as a DMS (not shown in FIG. 3) can also be controlled using the input device 302 (such as the one of FIG. 4) via microscope system 300. Thus, for example, after a specimen is marked, as described above, a menu appears on the DMS, allowing a user to select a description of the specimen from a number of possible pathologies. This selection takes place by using, for example, the middle mouse button 406 of mouse 402. In this way, the actuator previously used to mark the specimen (while the microscope system 300 was in a first state) is then is used to select a description of the specimen (while the microscope system 300 is in a second state). Again, this is not only efficient, but intuitive, since a user can use the same actuator (to perform this second needed function) in the second state that brought the microscope system 300 into that second state to begin with. Also, the movement of the mouse 402 is envisioned to position the cursor on the appropriate menu item in this situation. (In addition, it is envisioned that the coordinates of the "mark" are automatically sent to the DMS to be associated with the user's menu selection.)

Embodiments of the present invention contemplate that the DMS can utilize any number of different types of digital computer systems, such as those that are IBM PC-compatible and based upon an Intel 80×86 or Pentium processor from Intel Corporation of Santa Clara, Calif.

Of course, again, it should be understood that the present invention contemplates that the control of external devices could be accomplished in a manner other than that described above. In addition, embodiments of the present invention contemplate that external devices used with the microscope system 300 could also include any number of various types of electromechanical and other computer-type devices.

Various components allowing the present invention to perform the functions described above are now described with regard to FIGS. 5 and 6. Embodiments of the present invention contemplate that these components can reside within the microscope system 300, or that some or all of them can be part of a separate entity that is in communication with the microscope system 300.

Figure 5:
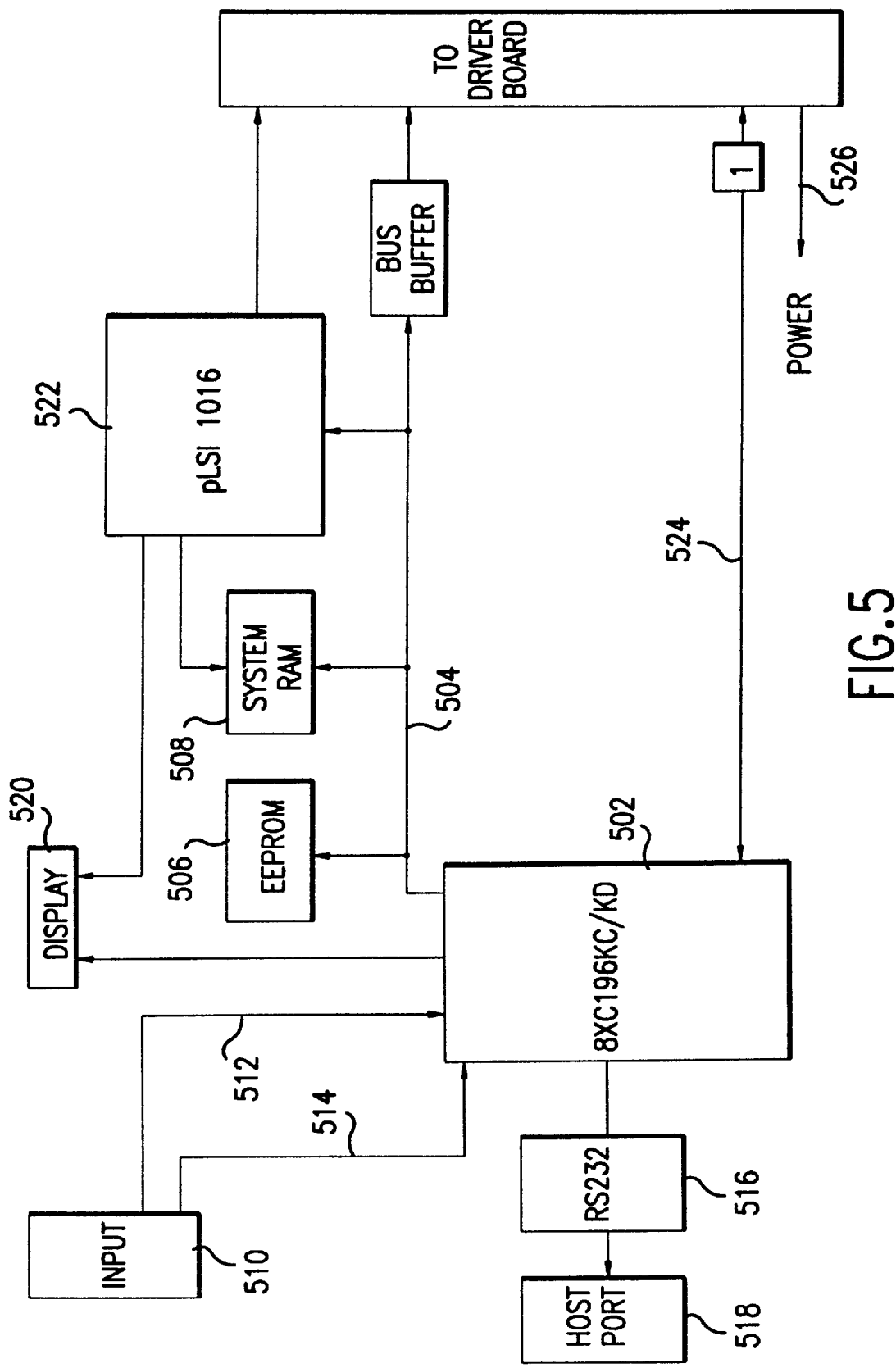
FIGS. 5 and 6 are circuit diagrams of aspects of the microscope system as contemplated by embodiments of the present invention.

Referring first to FIG. 5, this figure shows a controller board having a microprocessor 502. Although the invention contemplates that any number of different types of processor devices could be used, the embodiments shown in FIG. 5 depict an 8XC196 of the KC or KD variety from Intel Corporation. A bus 504 and a high speed serial sensor bus 524 are in communication with the microprocessor 502, allowing it to communicate with other components. Such other components include an input device 510 for allowing a user to transmit signals representing specific functions that the user desires the microscope system 300 to implement.

As indicated above, the input device 510 could be any number of input-type devices. The configuration specifically shown in FIG. 5 contemplates use of a mouse similar to that shown by FIG. 4. Thus, a serial input line 514 (corresponding to a line 412 in FIG. 4) allows the microprocessor 502 to receive signals indicating the actuation of a mouse button or the movement of the track ball under the mouse, while a focus line 512 (corresponding to a line 414 in FIG. 4) is used to indicate the position of the thumb wheel for use in focusing the microscope.

Still referring to FIG. 5, embodiments of the present invention contemplate that an EEPROM 506 contains a program used to determine the appropriate operation resulting from the signals received from the input device 510. Embodiments of the present invention contemplate that an NM93C256 serial EEPROM from National Semiconductor of Santa Clara, Calif. can used, although any number of different types of EEPROMs are also contemplated by the present invention. In addition, storage of the program could be on any number of computer-readable storage devices, including various optical, magnetic, biological or atomic storage devices.

The specific programming language used with the present invention and stored in EEPROM 506 will depend upon the type of processor 502 used. In the embodiments shown by FIG. 5, it is contemplated that MCS96 assembly language is used. Of course, in this and other embodiments contemplated by the present invention, the programming language used could also be a high-level programming language either interpreted or compiled into the appropriate machine language. In any event, embodiments of the present invention contemplate that the program used can be based upon the high-level pseudo-code given below:

move slide to start point
    set line spacing based on FOV and OVERLAP
    set MOUSE actuator to Adjust Speed
    set MARK actuator to Mark Slide
    Press SCAN to Start Scan

```
            -set SCAN to Pause State
         -scan as per preset pattern
            -adjust speed using MOUSE
         -at end of row index, change direction and continue
         -at end of scan area
            -set SCAN to Pause State
            -if coverage = 100% then:
                -transfer control to DMS if installed, else Exit
                -set MOUSE actuator to Position Cursor
                -set MARK actuator to Select From Menu
                -select specimen classification from menu using MOUSE & MARK
                -select specimen adequacy evaluation from menu using MOUSE & MARK
                -set MOUSE actuator to Position Stage
                -set MARK actuator to Mark Slide
                -DMS returns to Exit after specimen classification/report generation
            -if coverage <100% then
                -set SCAN to Scan State
```

```
            -press SCAN to move to start of first missed area and begin scan
            -set SCAN to Pause State
            -if coverage <100% at end of missed area scan, loop, else GoTo 100%
Exit -   if DOTTER installed & enabled
            -automatically dot electronically Marked cell locations
            -dot label end of slide to indicate screened and positive as appropriate
-return slide to load station
            -unload slide
-Press SCAN to continue
            -loop for next specimen
-To interrupt SCAN, press SCAN
                -set scan to Pause State
                -stage stops
                -stop position, direction & magnification recorded
                -set SCAN to Scan State
                -Objective Changer enabled (if installed)
                    -press OBJ to index
                -Electronic Cell Marking Enabled
                    -press MARK to electronically mark and transfer control to DMS
                -set MOUSE actuator to Position Stage
                -stage position follows MOUSE motion
                -press SCAN to resume autoscan
                    -set SCAN to Scan State
                    -stage goes to recorded stop point approaching from stored direction
                    -direction, default speed, and magnification restored
                    -OBJECTIVE & MARK disabled
                    -set MOUSE actuator to Adjust Speed
                    -scan resumes as where interrupted at default speed
-Press MARK to electronically mark cell or SCAN to resume normal scanning
    -on MARK, control, coordinate data & Z-height transferred to DMS if installed, else continue
                -set MOUSE actuator to Position Cursor
                -Set MARK actuator to Select From Menu
            -cell coordinates, focus position & direction recorded in DMS record
            -cell classification by selection from menu (select via mouse)
                -use MOUSE to point to DMS screen items
                -use MARK button to select DMS screen items
        -click DONE button to record information & return to Mark function
            -set MOUSE actuator to Position Stage to allow Marking additional cells
            -set MARK actuator to Mark Slide
            -Go to Exit
```

A system RAM 508 can be used for any number of reasons, including the temporary storage of portions of the program in the EEPROM 506 for usage by the microprocessor 502. The system RAM 508 could be a variety of different types of DRAM or SRAM, but its function can also be performed by Flash memory, magnetic, optical or a variety of other appropriate memory devices.

To facilitate a communications link with an external device, as discussed above, embodiments of the present invention contemplate using an RS232 port 516 for connection with the host port 518 (i.e., the communications port of the external device). It is envisioned that detection an external device is accomplished by sending a query to the RS232 and observing if any device responds.

Also contemplated for use with embodiments of the present invention are a power line 526 to supply power to the various components, and various "glue logic" components, indicated by a block 522. Also shown in FIG. 5 are how various components of FIG. 5 interface with those shown by the "driver board" of FIG. 6.

Figure 6:
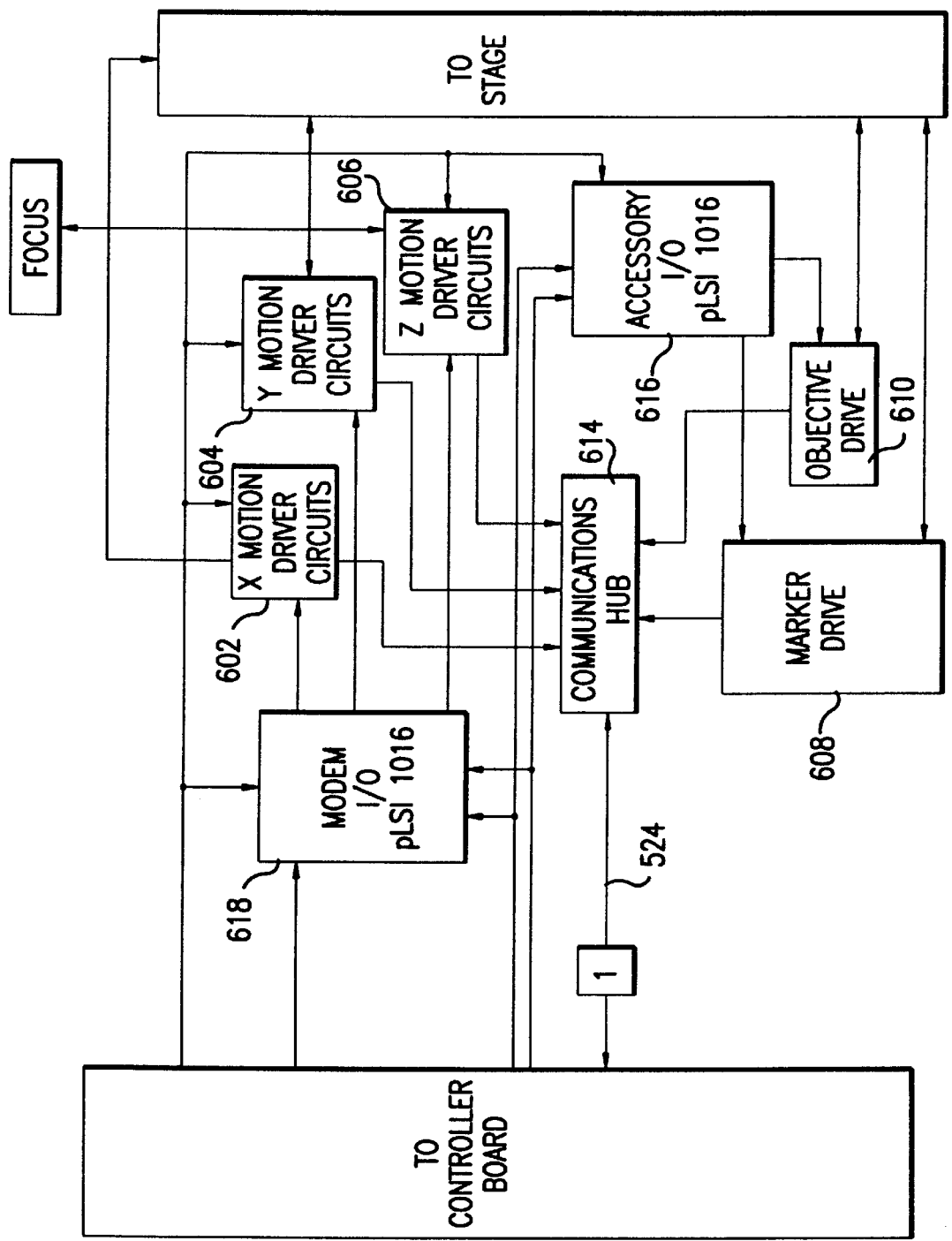

Referring now to FIG. 6, X and Y driver circuits 602 and 604 control the motion of the stage 304 in accordance with signals received from the microprocessor 502. Thus, embodiments of the present invention contemplate that the X and Y motion driver circuit 602 and 604 are in communication with some type of servos (not shown) that control the movement of the stage 304. The exact configuration of the servos and how they are physically linked to the stage itself are not crucial to the present invention, nor are the precise type of driver circuits used. One example of what could be used for X and Y motion driver circuit 602 and 604, however, include SGS 6217 circuits made by SGS Thomson of Phoenix, Ariz.

Z motion driver circuits 606 are similarly in communication with one or more servos (not shown) that allow for the focusing of the microscope system 300. The Z motion driver circuits 606 could be, for example, an "H-bridge" manufactured by Allegro of Worcester, Mass. Similarly, an objective drive 610 (e.g., an 'H-bridge" using an 80C51 processor made by Intel) can be used to drive a servo that controls the changing of the objectives 306, and a marker drive 608 (e.g., a TTL open collective contact closure) is used to drive the print device 308 for physically marking the slide. Also shown in FIG. 6 is a communications hub 614 and various other PLD's 616 and 618, used for "glue logic."

Again, it should be understood that the configuration and components shown by FIGS. 5 and 6 are by way of example only, and that embodiments of the present invention contemplate that various other configurations and components could, instead, be used.

Figure 7:
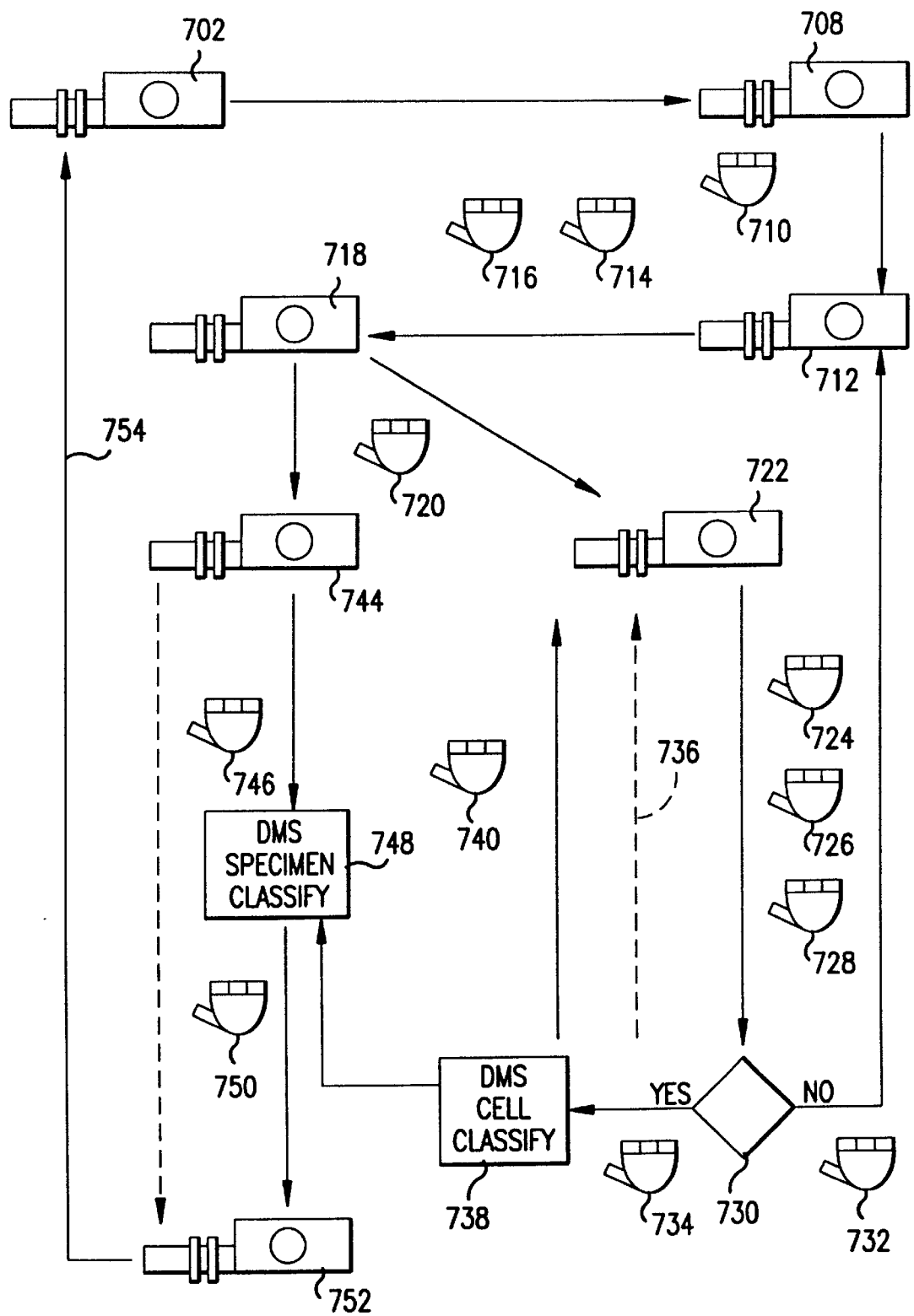
FIG. 7 is a flow diagram example of the utilization of the microscope system as contemplated by embodiments of the present invention.

An example of a sequence of steps as contemplated by embodiments of the present invention concerning the microscope system embodiments is shown with regard to FIG. 7. This sequence can be used, for example, for viewing pap smears. In discussing this figure, an input device similar to the type shown in FIG. 4 is used to diagrammatically illustrate the particular actuators envisioned to implement the various functions. However, it should be understood that reference to an input device similar to the one shown in FIG. 4 is for explanation purposes only, as is the discussion of FIG. 7, generally.

Referring now to FIG. 7, the first step is that a slide containing a specimen to be viewed is loaded onto the stage, as indicated by a block 702. The slide is then placed in a starting position (as defined by the scan sequence) as indicated by a block 708. At this point, the state of microscope system 300 is in the "pause" state.

When a user wishes to begin viewing the specimen, the left mouse button that toggles between the pause and scan states is pressed, as indicated by a mouse illustration 710. The automatic scan sequence then commences, as indicated by a block 712. During the scan sequence, the user may increase or decrease the speed of the sequencing by moving the mouse in a specified direction, as indicated generally by mouse illustration 714. Also, the user can adjust the focus by using the thumb wheel, as shown by mouse illustration 716.

If the user observes an item of interest on the slide and wants the scan sequence to stop, the user can depress the left mouse button, as indicated by mouse illustration 720. This puts microscope system 300 into the pause state, as shown by a block 722. While in the pause state, the position of a stage can be adjusted by moving the mouse in specified directions, as indicated by a mouse illustration 724. The focus can also be adjusted using the thumb wheel, as indicated by a mouse illustration 726, and the objectives can be changed by depressing the right button, as indicated by a mouse illustration 728.

While in the pause state, the user can then make a decision whether there is an item of interest (e.g., an abnormal cell), as indicated by a decision block 730. If no item of interest is believed to exist, the user can resume the scan sequence (i.e., the scan state) as indicated by a mouse illustration 732. However, if an item of interest is identified, the user can logically mark the relevant portion of the specimen, as indicated by a mouse illustration 734. If there is no communications link to a DMS 738 (or other external device), the user can then immediately resume the scan sequence (i.e., enter the scan state) by depressing the left button, as indicated by a mouse illustration 740 and a line 736.

If, however, there is a communications link to a DMS 738, the user can enter the type of abnormality found into the DMS 738. In embodiments contemplated by the present invention, the user can use the same actuator to select from a choice of possible abnormalities given to him or her from a menu. Embodiments of the present invention contemplate that information is automatically sent to the DMS 738 to indicate the position of the abnormality, as marked by the user. Thus, the location and type of abnormality are recorded by the DMS 738 and associated with each other. The user may then resume the scan sequence, as again indicated by mouse illustration 740, or can preempt the scanning and immediately end the viewing of that specimen, as indicated by a line 742.

Once the scan sequence has been completed, as indicated by a block 744, the user may then enter final results of the scan generally, as indicated by mouse illustration 746 and DMS screen 748. Once that has been completed (or if there is no DMS as indicated by a line 754), then embodiments of the present invention contemplate that the slide is physically marked at those portions that were previously logically marked by the user. This is indicated by a block 752.

In general, it should also be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It is to be appreciated and understood that the specific embodiments of the invention described hereinbefore are merely illustrative of the general principles of the invention. Various modifications may be made by those skilled in the art consistent with the principles set forth hereinbefore.

We claim:

1. A computer-readable medium, for use with a computer, for controlling a microscope system, comprising:

reception means for detecting the receipt of two or more signals from an input device having two or more actuators,
wherein each of said two or more signals correspond to the actuation of one of said two or more actuators;
scan means, responsive to said reception means, for executing a scan sequence, thereby placing the microscope system into a scan state,
wherein receipt of a first signal of said two or more signals by said reception means is interpreted in accordance with said scan state, causing implementation of a first function; and
pause means, responsive to said reception means, for placing the microscope system into a pause state,
wherein receipt of said first signal of said two or more signals by said reception means is interpreted in accordance with said pause state, causing implementation of a second function.

2. The computer-readable medium of claim 1, further comprising external device means, responsive to said reception means, for controlling at least one function on an external device, and for placing the microscope system into an external state.

3. The computer-readable medium of claim 1, wherein receipt of said first signal in said scan state is interpreted as a signal to implement one of the following functions as said first function:

a) controlling the speed of said scan sequence,
b) focusing a lens device,
c) placing the microscope system into a pause state;

and wherein receipt of said first signal in said pause state is interpreted as a signal to implement one of the following functions as said second function:

d) controlling the position of a stage upon which a specimen can be placed,
e) changing an objective of a lens device,
f) logically marking a selected portion of said specimen,
g) focusing said lens device,
h) placing the microscope system into a scan state.

4. A method for performing a plurality of functions in conjunction with a microscope system, wherein implementation of the plurality of functions is controlled by an input device having two or more actuators, and wherein the microscope system is operable in a first and a second state, the method comprising the steps of:

(1) operating the microscope system in a first state;
(2) receiving a signal from an input device, indicating, from said first state of said step (1), that a first function from one of the plurality of functions is to be implemented,
wherein said signal results from the actuation of a specified one of the two or more actuators of the input device;
(3) implementing said first function in response to said signal of said step (2);
(4) determining, from said signal of said step (2), whether the state of the microscope system should be changed to the second state, wherein, upon a determination that the microscope system should be changed to the second state, implementing a second function in response to a subsequent occurrence of said signal of said step (2) resulting from the actuation of said specified one of the two or more actuators of the input device.

5. The method of claim 4, wherein the first state is a scan state for executing an automated scan sequence, and wherein the second state is a pause state for pausing said scan sequence.

6. The method of claim 5, wherein said step (2) comprises the step of controlling, using a first one of said two or more actuators of said input device, the speed of said scan sequence when the microscope system is operating in said scan state, and controlling the position of a stage of the microscope system when the microscope system is operating in said pause state.

7. The method of claim 4, wherein the first state is a scan state for executing an automated scan sequence, and wherein the second state is an external state for controlling at least one function on an external device.

* * * * *